United States Patent
Van Lammeren

(10) Patent No.: US 7,315,332 B2
(45) Date of Patent: Jan. 1, 2008

(54) VIDEO AND TEXT DISPLAY WITH REDUCED TEXT FLICKER

(75) Inventor: Johannes Petrus Maria Van Lammeren, Nijmegen (NL)

(73) Assignee: NXP B.V., Eindhoven (NL)

( * ) Notice: Subject to any disclaimer, the term of this patent is extended or adjusted under 35 U.S.C. 154(b) by 576 days.

(21) Appl. No.: 10/513,482

(22) PCT Filed: Apr. 11, 2003

(86) PCT No.: PCT/IB03/01499

§ 371 (c)(1),
(2), (4) Date: Nov. 3, 2004

(87) PCT Pub. No.: WO03/096688

PCT Pub. Date: Nov. 20, 2003

(65) Prior Publication Data

US 2005/0168637 A1   Aug. 4, 2005

(30) Foreign Application Priority Data

May 8, 2002   (EP) .................................. 02076814

(51) Int. Cl.
*H04N 5/445* (2006.01)
(52) U.S. Cl. ...................... 348/564; 348/468
(58) Field of Classification Search ........... 348/468, 348/564, 554, 465, 447, 910, 448, 569; 725/137
See application file for complete search history.

(56) References Cited

U.S. PATENT DOCUMENTS

| | | | |
|---|---|---|---|
| 5,109,279 A | 4/1992 | Ando | 358/147 |
| 6,188,487 B1 * | 2/2001 | Matsubara | 358/1.15 |
| 6,204,883 B1 * | 3/2001 | Tsukagoshi | 348/468 |
| 6,259,487 B1 * | 7/2001 | Bril | 348/553 |
| 6,281,933 B1 * | 8/2001 | Ritter | 348/447 |
| 6,297,797 B1 * | 10/2001 | Takeuchi et al. | 345/467 |
| 6,456,329 B1 * | 9/2002 | Tinker et al. | 348/448 |
| 6,567,925 B1 * | 5/2003 | Kimura | 713/502 |
| 6,642,934 B2 * | 11/2003 | Hrusecky et al. | 345/629 |

FOREIGN PATENT DOCUMENTS

EP   0697790   2/1996

* cited by examiner

Primary Examiner—Victor R. Kostak

(57) ABSTRACT

A display apparatus comprises a signal converter (SC) which converts input text information (IT) and interlaced input video information (IV) with a number of video lines (Li) in a video field (Fi) into a display signal (DS) which comprises display text (Ti) and display video (Vi). An addressing circuit (AD) addresses a display screen (DSC) of the display apparatus in successive non-interlaced display fields (Fi) which have a duration substantially equal to the video field (Fi) and a number of display lines (DLi) which is substantially twice the number of video lines (Li). The signal converter (SC) has an output to supply the display signal (DS) in which the display video (Vi) is present on odd or even display lines (DLi) only, in respective successive display fields (Fi), and in which the display text (Ti) is present on same display lines (DLi) of the successive display fields (Fi).

11 Claims, 3 Drawing Sheets

VIDEO AND TEXT DISPLAY WITH REDUCED TEXT FLICKER

The invention relates to a display apparatus with a signal converter for converting input text information and interlaced input video information into a display signal, such a signal converter, and a method of converting a signal.

U.S. Pat. No. 5,109,279 discloses a circuit for displaying TXT data as an auxiliary image which is superposed on a TV picture. The auxiliary image may cover ¼ or ½ of a display screen of a CRT. The TV picture is the standard TV signal which is displayed in an interlaced manner. The TXT signal is displayed in a non-interlaced manner by displaying successively a first and a second field of the TXT signal only. This has the drawback that the TXT picture is susceptible to large area flicker and to movement artifacts.

It is an object of the invention to provide a display apparatus suitable to display video information in an interlaced manner and text information in a non-interlaced manner with less large area flicker.

To this end, a first aspect of the invention provides a display apparatus as claimed in claim 1. A second aspect of the invention provides a signal converter as claimed in claim 10. A third aspect of the invention provides a method of converting as claimed in claim 11. Advantageous embodiments are defined in the dependent claims.

The display apparatus has a display screen on which a display signal is displayed. The display signal comprises the display video which is optimally displayed in an interlaced manner, and the display text which is optimally displayed in a non-interlaced manner. The video information is received as interlaced input video information which has video fields of video lines. The video lines of successive fields comprise interlaced video information.

The display screen is addressed by the addressing circuit to display non-interlaced display fields of display lines. The display fields have a substantially same duration as the video fields and a number of display lines which is substantially twice the number of video lines.

The signal converter supplies the display signal which comprises, in successive display fields: the display video alternatively on odd or even display lines only, and the display text on same display lines of said successive display fields.

By using, in successive display fields, only halve of the available display lines which are displaced by one line, the video information is displayed in an interlaced manner again. The text information is displayed in every display field on the same lines and thus is represented in a non-interlaced manner.

As an example, the video information may be a television broadcast signal such as NTSC or PAL, and the text signal may be a teletext or an OSD (on screen display) signal. The PAL television signal comprises a frame of 625 lines which forms a complete picture and which is composed of a so called odd and even field which have lines that interlace. The odd field comprises the 312½ odd lines of the picture, the even field comprises the 312½ even lines of the picture. If the video signal is a PAL television signal, the display fields have the same 50 Hz repetition frequency as the video fields and 625 lines instead of 312½ lines. The 625 lines of successive display fields are displayed in a non-interlaced manner, and thus overlap each other.

During a particular display field, the odd input video lines are displayed on the odd display lines, during the next display field, the even input video lines are displayed on the even display lines and so on. In all display fields, the text information is displayed on the odd display lines only, or on the even display lines only, or on all display lines if the text information is generated with the same number of lines as the number of (visible) display lines.

The text information may be displayed over the display video thereby obscuring the displayed video. Preferably, the display video is compressed to cover only a part of the display screen. The text information is displayed on the remaining part of the display screen.

In an embodiment claimed in claim 2, the signal converter comprises a memory and a clock generator. The clock generator supplies a write clock to the memory to store the input video information in the memory, and a read clock to read the display video from the memory. The read clock has a repetition frequency which is at least two times higher than the repetition frequency of the write clock. A read clock with twice the frequency of the write clock is required to convert an input video line into a display video line which has a duration which is halve the duration of the input video line. If the display video has to be compressed to cover only a part of the display screen, the read clock may have a frequency higher than twice the frequency of the write clock.

In an embodiment claimed in claim 8, if the video information is displayed on the first halve of the display screen and the text information on the second halve of the display screen (or the other way around), the stored video information should be read with a read clock which is four times the write clock. The text generator should be controlled to supply its text information during the period of time the remaining halve of the display screen is not used to display the video information.

In this manner, the video information and the text information are displayed besides each other and can be watched in complete, which is not the case when the text information obscures the video information as occurs with PIP. This feature is especially relevant if the display screen has a 16 to 9 aspect ratio.

Alternatively, it is possible to use a memory to compress both the video information and the text information. The input video information and the text information are stored line by line in the line memory. The controlling circuit controls the storing of the video information and the text information in the line memory and the reading of the data from the line memory such that in successive display fields the video information is alternatively displayed on odd or even lines only, and the text information is displayed on the same lines.

Alternatively, the compression of the video information and if applicable, the text information may be obtained by skipping samples.

It is also possible to superpose the text information on the video information in a same manner as known from PIP (Picture In Picture).

In an embodiment claimed in claim 3, the lines of the video information are displayed in a predetermined display field on the odd lines only by supplying the read clock to the memory during the odd lines only. In the next display field, the lines of the video information are displayed on the even lines only by supplying the read clock to the memory during the even lines only.

In an embodiment claimed in claim 4, the controller controls the text generator to supply the text information to the same display lines of successive display fields to obtain a non-interlaced display of the text information.

Usually, the text generator comprises a memory in which the text information to be displayed is stored. The instant of reading the data may be controlled by controlling a read clock of this memory.

In an embodiment claimed in claim 5, the lines of the text information are displayed on either the odd or the even display lines of successive display fields. This has the advantage that a common available text generator can be used. The text generator only needs to be able to provide text information for halve of the display lines at at least twice the rate.

In an embodiment claimed in claim 6, the text information is displayed on all (visible) lines of the display fields. This improves the quality of the display of the text information, but requires a text generator able to generate the text information for all (visible) display lines.

In an embodiment as claimed in claim 7, the display lines or parts of the display lines on which no video and no text information is displayed are filled in with black level. The filling in of the black level may be obtained by blanking.

For the area of the display screen where the interlaced video is displayed, the line parts to be filled in are in the odd lines when the video information is displayed on the even lines, or the even lines when the video information is displayed on the odd lines. For the area of the display screen where the text information is displayed, if the text information is displayed on the even lines only, always the odd lines are blanked, if the text information is displayed on the odd lines only, always the even lines are blanked. If the text information is displayed on all the lines, no lines have to be blanked.

These and other aspects of the invention are apparent from and will be elucidated with reference to the embodiments described hereinafter.

The same references in different Figures denote the same elements or signals which have the same function. References indicated by a capital letter followed by an indices i refer to one or more elements or signals which are indicated by the same capital letter and a number instead of the i, such references also refer to elements or signal which are indicated by the same capital letter followed by one or more apostrophes.

Figure 1:
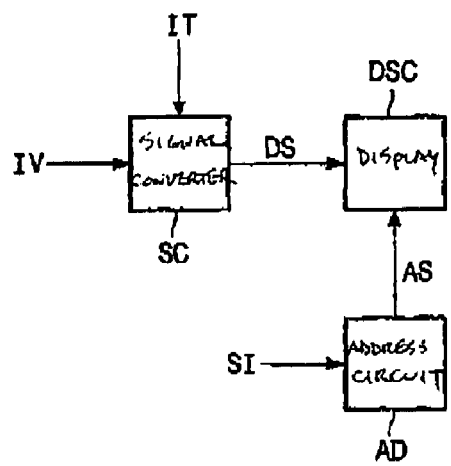
FIG. 1 shows a block diagram of a display apparatus in accordance with the invention.

FIG. 1 shows a block diagram of a display apparatus in accordance with the invention. The display apparatus comprises a signal converter SC, a display screen DSC and an addressing circuit AD. The signal converter SC receives the input video information or signal IV and the input text information or signal IT to supply the display signal DS to the display screen DSC of a display device. The addressing circuit AD receives synchronization information SI belonging to the input video information IV and supplies addressing information AS to the display device.

The input video signal IV may be a standard television broadcast baseband signal such as the R, G, and B signal, or a CVBS signal. The synchronization information SI may comprise the horizontal and vertical synchronization pulses. The input text information IT may be generated by a teletext decoder or an On Screen Display (OSD) circuit. The display device may be a Cathode Ray Tube (CRT) or a matrix display such as a Liquid Crystal Display (LCD) or a Plasma Display Panel (PDP). The addressing circuit AS comprises a horizontal and vertical deflection if the display device is a CRT, or row and column drivers if the display device is a matrix display.

Figure 2:
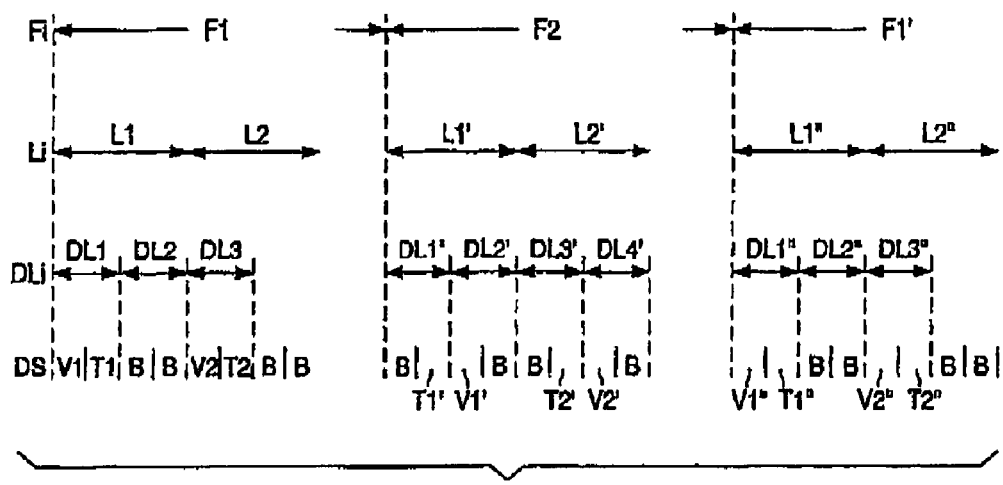
FIG. 2 shows a timing overview to elucidate the video lines and fields of the input video information, and the display lines and display fields of the display signal, FIG. 3 show the information displayed on display lines of two consecutive display fields in an embodiment in accordance with the invention.

The addressing circuit AD drives the display device such that in a video field period Fi (see FIG. 2: F1, F2, F1') of the input video signal IV the number of display lines DLi (DL1, DL2, DL3; DL1', DL2', DL3', DL4'; DL1", DL2", DL3") is the double of the number of video lines Li (L1, L2, L1', L2', L1", L2") of the video field period Fi. The consecutive display fields Fi are displayed in a non-interlacing manner. Such a drive of a display device is known as progressive scan. However, the information displayed on the progressive scanned display device in accordance with the invention is different from the prior art. In the prior art progressive scanned display devices, the input video information IV is processed to be displayed on all display lines DLi. In the progressive scanned display device in accordance with the invention, the input video information IV is displayed on half of the display lines DLi of a display field Fi only.

FIG. 2 shows a timing overview to elucidate from top to bottom in the order mentioned: the fields Fi of the input video information IV, which are equal to the fields Fi of the display signal DS, the lines Li of the input video information IV, the display lines DLi of the display fields Fi, and the display signal DS. The display signal DS comprises display video Vi and display text Ti and information B where no display video Vi and no display text Ti is displayed.

Of the fields Fi the successive fields F1, F2 and F1' are shown. With respect to the input video information IV, for example, the fields F1 and F1' are odd fields which comprise the odd video lines L1, L2, . . . and L1", L2", . . . . The field F2 is an even field and comprises the even video lines L1', L2', . . . . The odd and even fields Fi comprise interlaced video information, and thus are intended to be displayed on interlacing display lines DLi.

With respect to the display signal DS, all the fields Fi comprise display lines DLi which are displayed in a non-interlaced manner: display line DL1 of the display field F1 is displayed on the same position on the display screen as the display line DL1' of the display field F2, and so on for all display lines DLi with the same indices i. The number of display lines DLi in a field Fi is the double of the number of video lines in the field Fi. By way of example, FIG. 2 shows the display signal DS when the input video signal IV is displayed as display video Vi on the left halve of the display screen DSC, and the input text information IT as display text information Ti on the right halve of the display screen DSC.

The display signal DS shows that during the field F1, the input video information IV of the video line L1 is displayed on the first halve of the display line DL1 as the display video V1. The corresponding line T1 of the display text Ti is displayed on the last halve of the display line DL1. On the second display line DL2 of the field F1, no display video or text information is displayed and a black level B is inserted. The input video information IV of video line L2 is displayed on the first halve of the display line DL3 as the display video V2. The corresponding line T2 of the display text Ti is displayed on the last halve of the display line DL3. And so on during the rest of field F1. A same order of data and signals occurs in the all the odd fields F1, F1', . . . .

The display signal DS shows that during the field F2, the input video information IV of video line L1' is displayed on the first halve of the display line DL2' as the display video V1'. The corresponding line T1' of the display text Ti is displayed on the last halve of the display line DL1. On the first halve of the display line DL1 and the last halve of the display line DL2 of the field F2, no information is displayed and the black level B is inserted. The input video information IV of video line L2' is displayed on the first halve of the display line DL4' as the display video V2'. The corresponding line T2' of the display text Ti is displayed on the last halve of the display line DL3'. And so on during the rest of field F2. A same order of data and signals occurs in the all the even fields F2, . . . .

FIG. 2 illustrates that the input video information IV is displayed in an interlaced manner: during the odd fields F1, F1', . . . the video is displayed as display video V1, V1", . . . on the odd display lines DL1, DL1", while during the even fields F2, . . . the video is displayed as display video V1", . . . on the even display lines DL2', DL4' . . . .

The display text lines Ti are displayed on the same display lines DLi (in this example, the odd lines) in all the fields Fi, and thus are displayed in a non-interlaced manner.

It has to be noted that FIG. 2 only serves as an example of a possible way to display the input video information IV on non-interlaced display lines DLi in an interlaced manner and to display the input text information in a non-interlaced manner. Relevant is that successive fields Fi of the input video information IV are displayed in successive fields Fi alternating on the even display lines DLi or the odd display lines DLi. While the text information is displayed in a non-interlaced manner by supplying the display text information Ti on the same display lines DLi in all the display fields Fi.

Figure 3A:
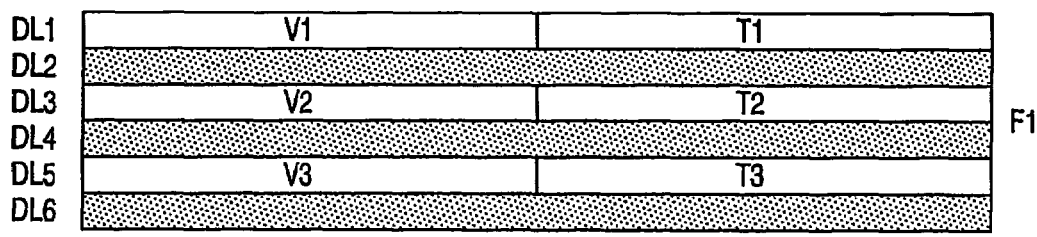
Figure 3B:
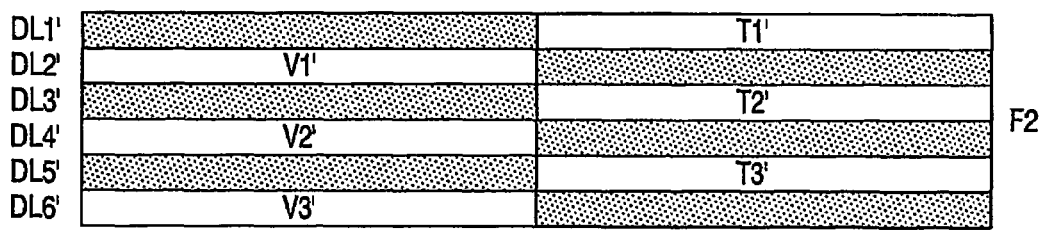

FIGS. 3A and 3B show the information displayed on display lines of two consecutive display fields. FIG. 3A shows the information displayed on six consecutive lines DL1 to DL6 of the field F1, and FIG. 3B shows the information displayed on the corresponding six consecutive lines DL1' to DL6' of the next field F2.

By way of example, FIG. 3 shows the displayed information on the display screen DSC when the input video signal IV is displayed as display video Vi on the left halve of the display screen DSC, and the input text information IT as display text information Ti on the right halve of the display screen DSC.

The display lines DLi or the parts (which in this example are halve display lines DLi) of the display lines DLi on which no video information and no text information is displayed are presented in black.

During the field F1, the display video V1, V2, V3, . . . is displayed on the left halve of the odd display lines DL1, DL3, DL5, . . . . The display text T1, T2, T3, . . . is displayed on the right halve of the odd display lines DL1, DL3, DL5, . . . . No information is displayed on the even display lines DL2, DL4, DL6, . . . .

During the field F2, the display video V1', V2', V3', . . . is displayed on the left halve of the even display lines DL2', DL4', DL6', . . . . The display text T1', T2', T3', . . . . is still displayed on the right halve of the odd display lines DL1, DL3, DL5, . . . . No information is displayed on the left halve of the odd display lines DL1, DL3, DL5, . . . and on the right halve of the even display lines DL2, DL4, DL6, . . . .

Consequently, the display video Vi is displayed in an interlaced manner and the text information is displayed in a non-interlaced manner.

Figure 4:
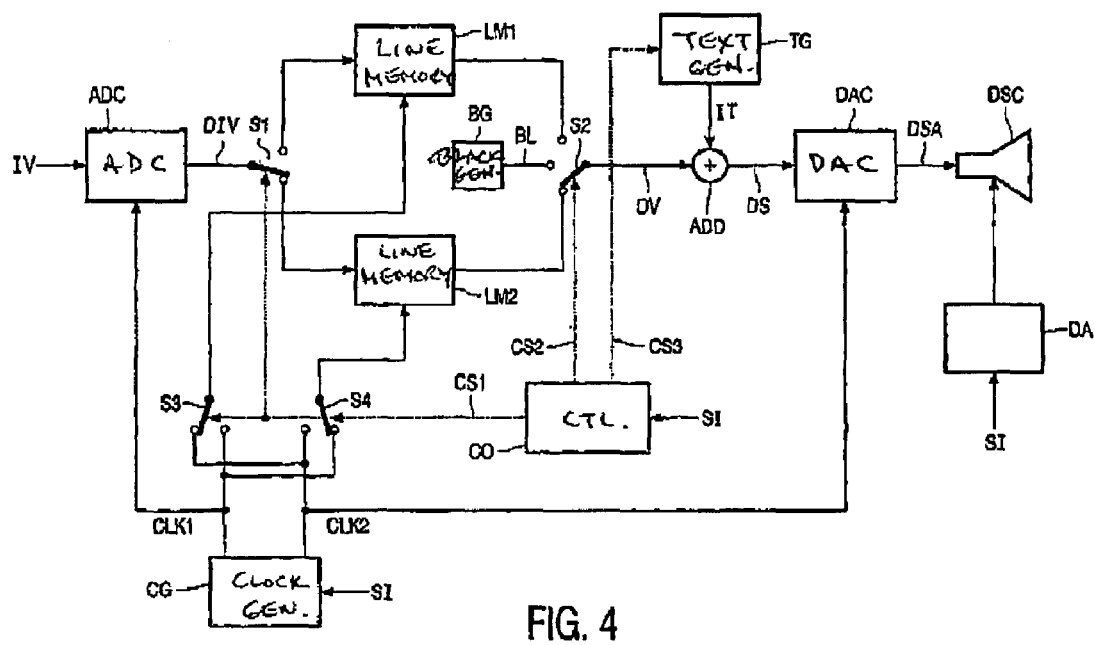
FIG. 4 shows a block diagram of an embodiment of the signal converter in accordance with the invention.

FIG. 4 shows a block diagram of an embodiment of the signal converter in accordance with the invention.

The analog to digital converter ADC receives an analog input video signal IV which may be a baseband TV signal, and supplies a digital input video signal DIV to the switch S1. The analog to digital converter ADC can be omitted if the input video IV signal is received in digital form. The switch S1 supplies the digital input signal to the line memory LM1 or to the line memory LM2. A switch S2 supplies the display video DV by selecting either the output of the line memory LM1, the output of the line memory LM2, or the black level signal BL supplied by the black level generator BG. The adder ADD adds the text information TI to the display video DV to obtain the display signal DS. The digital to analog converter DAC converts the digital display signal DS into an analog display signal DSA which is supplied to the display device DSC.

The addressing circuit DA receives synchronization information SI belonging to the input video information IV and addresses the display device DSC to provide in a display field Fi a number of display lines DLi that is twice the number of the video lines Li of the input video information IV. The display field Fi has the same duration as the field Fi of the input information IV. The synchronization information SI comprises the horizontal and vertical synchronization information. The addressing circuit DA may be the known addressing circuit used in progressive scan display apparatuses.

A clock generator CG generates a write clock CLK1 and a read clock CLK2. The clock generator CG may be a known line phase locked loop which receives the synchronization information SI to lock the clock signals CLK1 and CLK2 to the line synchronization pulses. The write clock CLK1 is supplied to the analog to digital converter ADC. The read clock CLK2 is supplied to the digital to analog converter DAC.

The line memory LM1 has a clock input which receives the write clock CLK1 or the read clock CLK2 via the switch S3. The line memory LM2 has a clock input which receives the write clock CLK1 or the read clock CLK2 via the switch S4.

A controller CO receives the synchronization information SI and supplies the control signal CS1 to the switches S1, S3 and S4, the control signal CS2 to the switch S2 and the control signal CS3 to the text generator TG.

To elucidate the operation of the signal converter SC, the starting situation is defined by the controller CO which commands the switches S1 to S4 to take the positions shown in FIG. 4. The write clock CLK1 is supplied to the line memory LM2 to write a line Li of the input video IV into this memory LM2. During this video line Li the read clock CLK2 is supplied to the line memory LM1 to read a previously stored line Li from this memory LM1. In a next video line Li, the switches S1 to S4 take the opposite positions and the video information stored in the memory LM2 during the preceding video line Li is read while the present video line Li is stored in the memory LM1.

Two situations are discussed, in the first situation, the input video information IV is displayed full screen, in the second situation, the input video information IV is displayed on the left halve of the display screen DS.

In the first situation, the read clock CLK2 has a frequency which is twice the frequency of the write clock CLK1. The switch S2 is connected to the line memory LM2 when a stored video line Li is read from this memory LM2. The switch S2 is connected to the line memory LM1 when a stored video line Li is read from this memory LM1. The switch S2 is connected to the black level generator BG when no information is read from both the memory LM1 and the memory LM2. If the text generator TG is controlled by the control signal CS3 to display text Ti, this display text Ti will cover or mix with the display video information DV. The display video information DV is covered when in the area where the text Ti is displayed, the text Ti is displayed on all display lines DLi, or when the display lines DLi between the text lines are blanked.

In the second situation, the read clock CLK2 has a frequency which is four times the frequency of the write clock CLK1. For the explanation of the operation of the signal converter SC the lines DL1 to DL4 shown in FIG. 3A, and the lines DL1' to DL4' shown in FIG. 3B will be discussed.

With reference to FIG. 3A, it is assumed that the line DL1 is read from the memory LM1. All the switches S1 to S4 are in the position shown in FIG. 4. The stored video line Li which comprises the video information V1 is read from the line memory LM1 at four times the rate at which this video line is written into the memory LM1. For example, the write clock CLK1 has a frequency of 13.5 MHz and the read clock CLK2 has a frequency of 54 MHz. Consequently, the video information V1 is displayed in the first have of the display line DL1. The control signal CS3 instructs the text generator TG to display a line of the text information IT during the second halve of the display line DL1. In the next display line DL2, the switch S2 is put in the middle position and a black line is displayed. The video information V2 of the present video line is stored in the memory LM2 during the display lines DL1 and DL2.

During the first halve of the display line DL3, the switches S1 to S4 are in the opposite positions to read the video information V2 out of the memory LM2. The control signal CS3 instructs the text generator TG to display a line of the text information IT during the second halve of the display line DL3. In the next display line DL4, the switch S2 is put in the middle position and a black line is displayed.

This sequence is repeated for every block of four adjacent display lines DLi.

With reference to FIG. 3B, it is assumed that the line DL1' is read from the memory LM1. All the switches S1 to S3 are in the position shown in FIG. 4. During the first halve of the display line DL1', the switch S2 is in the middle position to supply black information. During the second halve of the display line DL1', the control signal CS3 instructs the text generator TG to display a line of the text information IT. During the first halve of the display line DL2', the switch S2 is in the lower position to read the information out of the memory LM1 to display the video information V1'. During the second halve of the display line DL2', the switch S2 is in the middle position to supply black information. The video information V2' of the present video line is stored in the memory LM2 during the display lines DL1' and DL2'.

During the first halve of the display line DL3', the switches S1 to S3 are in the opposite positions to enable to read the video information V2 out of the memory LM2, and the switch S2 is in the middle position to supply black information. During the second halve of the display line DL3', the control signal CS3 instructs the text generator TG to display a line of the text information IT. During the first halve of the display line DL4', the switch S2 is in the upper position to read the information out of the memory LM2 to display the video information V2'. During the second halve of the display line DL2', the switch S2 is in the middle position to supply black information.

This sequence is repeated for every block of four adjacent display lines Dli'.

It should be noted that the above-mentioned embodiments illustrate rather than limit the invention, and that those skilled in the art will be able to design many alternative embodiments without departing from the scope of the appended claims. For example, the black level generator BG and the middle position of the switch S2 may be omitted. The insertion of the black information BL may be obtained via a blanking input of a RGB processor (available as integrated circuit) positioned between the digital to analog converter DAC and the display device DSC. The adder ADD may be part of the RGB processor.

Instead of inserting the black level, it is possible to repeat the video or text information of a previous line.

Instead of the switches S1 and S2 it is possible to arrange the memories LM1 and LM2 in parallel between the converter ADC and the adder ADD. The line memories LM1 and LM2 are controlled via a read/write input to select between storing or reading information. The read clock signal CLK2 is halted after the stored information is read from the line memory LM1 or LM2 during the appropriate period in time.

In the claims, any reference signs placed between parenthesis shall not be construed as limiting the claim. The word "comprising" does not exclude the presence of other elements or steps than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

To summarize, the invention is directed to a display apparatus which comprises a signal converter SC which converts input text information IT and interlaced input video information IV with a number of video lines Li in a video field Fi into a display signal DS which comprises display text Ti and display video Vi. An addressing circuit AD addresses a display screen DSC of the display apparatus in successive non-interlacing display fields Fi which have a duration substantially equal to the video field Fi and a number of display lines DLi which is substantially twice the number of video lines Li. The signal converter SC has an output to supply the display signal DS in which the display video Vi is present on odd or even display lines DLi only, in respective successive display fields Fi, and in which the display text Ti is present on same display lines DLi of the successive display fields Fi.

The invention claimed is:

1. A display apparatus comprising:
    a signal converter for converting input text information and interlaced input video information having a number of video lines in a video field into a display signal (DS) comprising display text and display video, and
    addressing means for addressing a display screen of the display apparatus in successive non-interlaced display fields having a substantially same duration as the video field and a number of display lines being substantially twice the number of video lines,
    wherein the signal converter has an output for supplying the display signal in which the display video is present on odd or even display lines only in respective successive display fields, and in which the display text is present on same display lines of the successive display fields.

2. A display apparatus as claimed in claim 1, wherein the signal converter comprises a memory and a clock generator for supplying a write clock to the memory to store said input video information in the memory, and for supplying a read clock to the memory to read the display video from the memory, wherein the read clock has a repetition frequency which is at least two times higher than a repetition frequency of the write clock.

3. A display apparatus as claimed in claim 2, wherein the signal converter further comprises a controller for controlling the clock generator to supply the read clock only during odd display lines of a predetermined display field and only during even lines of a successive display field.

4. A display apparatus as claimed in claim 1, wherein the display apparatus comprises a text generator for supplying the input text information being the display text, and the signal converter comprises a controller for controlling the text generator to supply the display text on same lines of said successive display fields.

5. A display apparatus as claimed in claim 4, wherein the text generator has an input for receiving timing information from the controller to supply the display text on either the odd or the even lines of the display fields.

6. A display apparatus as claimed in claim 4, wherein the text generator has an input for receiving timing information from the controller to supply the display text on substantially all the lines of the display fields.

7. A display apparatus as claimed in claim 1, wherein the display apparatus further comprises means for supplying a black-level to the display lines or part of the display lines on which no display video or no display text is displayed.

8. A display apparatus as claimed in claim 2, wherein the display apparatus comprises a text generator for supplying the input text information being the display text, and the signal converter comprises a controller for controlling the text generator to supply the display text on same lines of said successive display fields, wherein the repetition frequency of the read clock is four times the repetition frequency of the write clock, and wherein the controller is adapted for controlling the memory to supply the display video on either a left or right halve of the display screen, and for controlling the text generator to supply the display text on a remaining halve of the display screen.

9. A display apparatus as claimed in claim 2, wherein the memory comprises two line memories for storing data of a predetermined one of the video lines in one of the two line memories, and reading the display video of a preceding video line from the other line memory.

10. A signal converter for converting input text information and interlaced input video information having a number of video lines in a video field into a display signal suitable for display on a display screen of a display apparatus being addressed in successive non-interlaced display fields having a substantially same duration as the video field and a number of display lines being substantially twice the number of video lines, the display signal comprising display text and display video, the signal converter having an output for supplying the display signal comprising, in successive display fields, the display video alternatively on odd or even display lines only, and the display text on same display lines of said successive display fields.

11. A method of converting input text information and interlaced input video information having a number of video lines in a video field into a display signal comprising display text and display video, the method comprising addressing a display screen of a display apparatus in successive non-interlaced display fields having a substantially same duration as the video field and a number of display lines being substantially twice the number of video lines, supplying, in successive display fields, the display video alternatively on odd or even display lines only, and for supplying the display text on same display lines of said successive display fields.

* * * * *